(12) United States Patent
Kozak et al.

(10) Patent No.: US 10,466,504 B2
(45) Date of Patent: Nov. 5, 2019

(54) EYEGLASSES WITH INTEGRATED MAGNETIC CLIP

(71) Applicant: KORE ESSENTIALS INC., San Diego, CA (US)

(72) Inventors: Karl Kozak, San Diego, CA (US); Robin Laatz, San Diego, CA (US)

(73) Assignee: KORE ESSENTIALS, INC., San Diego, CA (US)

( * ) Notice: Subject to any disclaimer, the term of this patent is extended or adjusted under 35 U.S.C. 154(b) by 0 days.

(21) Appl. No.: 15/979,361

(22) Filed: May 14, 2018

(65) Prior Publication Data

US 2018/0335643 A1 Nov. 22, 2018

Related U.S. Application Data

(60) Provisional application No. 62/507,523, filed on May 17, 2017.

(51) Int. Cl.
*G02C 5/14* (2006.01)
*G02C 5/16* (2006.01)

(52) U.S. Cl.
CPC ............ *G02C 5/143* (2013.01); *G02C 5/16* (2013.01); *G02C 2200/02* (2013.01)

(58) Field of Classification Search
CPC ...... G02C 5/14; G02C 2200/02; G02C 5/006; G02C 11/02; G02C 2200/06; G02C 5/08; G02C 5/143

USPC ................ 351/111, 121, 51, 52; 24/3.3
See application file for complete search history.

(56) References Cited

U.S. PATENT DOCUMENTS

| | | | |
|---|---|---|---|
| 5,682,222 A | 10/1997 | Chao | |
| D417,462 S | 12/1999 | Chang | |
| 6,425,664 B1 * | 7/2002 | Liu | G02C 3/04 |
| | | | 24/3.3 |
| 6,568,805 B1 | 5/2003 | Dietz | |
| 6,848,787 B2 | 2/2005 | Dietz | |
| 7,172,283 B1 * | 2/2007 | Asta | G02C 3/04 |
| | | | 24/3.3 |
| 2004/0183993 A1 | 9/2004 | Dietz | |
| 2004/0239873 A1 | 12/2004 | Dietz | |

* cited by examiner

*Primary Examiner* — Hung X Dang
(74) *Attorney, Agent, or Firm* — Coastal Patent Law Group, P.C.

(57) ABSTRACT

The disclosure concerns eyeglasses with an integrated magnetic clip for removably attaching the eyeglasses to a wearer's clothing, a vehicular sun visor, or other object. The eyeglasses may embody any wearable optics device, such as, prescription glasses, reading glasses, sunglasses, and the like. In some embodiments, the eyeglasses further include a shield element positioned between a magnetic element of the magnetic clip and a wearer's body for reducing or eliminating magnetic field effects on the body of the wearer.

16 Claims, 8 Drawing Sheets

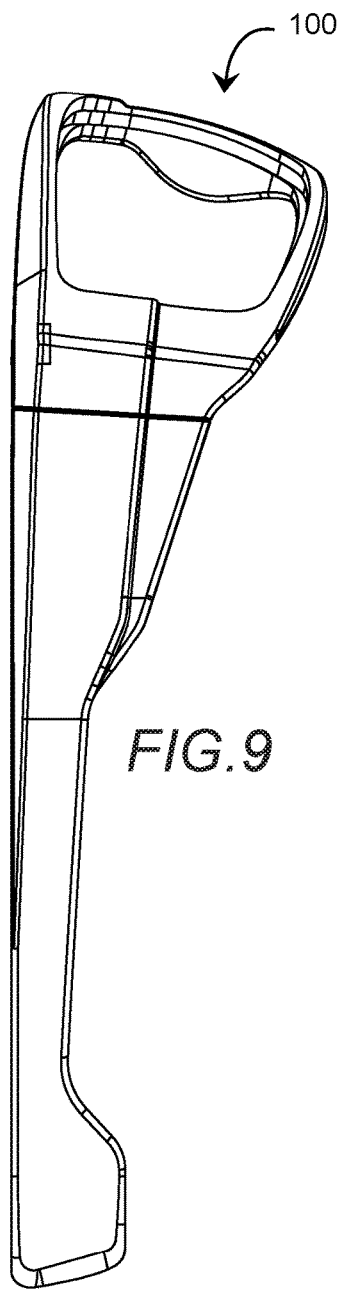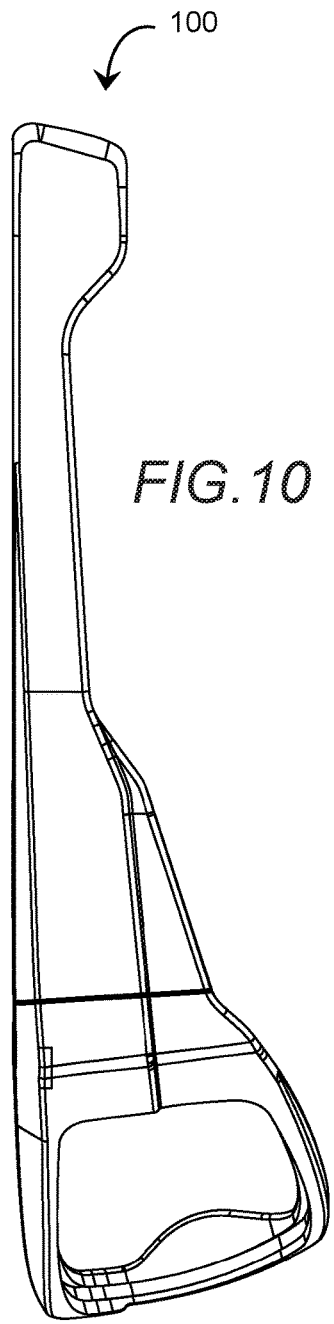

EYEGLASSES WITH INTEGRATED MAGNETIC CLIP

CROSS-REFERENCE TO RELATED APPLICATIONS

This application claims benefit of priority with U.S. Provisional Ser. No. 62/507,523, filed May 17, 2017; the entire contents of which are hereby incorporated by reference.

BACKGROUND OF THE INVENTION

Field of the Invention

This invention relates to eyeglasses; and more particularly, to eyeglasses with an integrated magnetic clip for removably attaching the eyeglasses to a user's clothing or other object.

Description of the Related Art

Eyeglasses, such as prescription glasses, reading glasses, sunglasses, and goggles for a crowded art often referred to as "optics".

Conventional eyeglasses are generally known to include: a frame front, one or more lenses fixed within the frame front, and two arms, where a first arm is coupled to the frame front at a first hinge point, and a second arm of the two arms is coupled to the frame front at a second hinge point. The frame front is generally configured to receive the one or more lenses therein.

There exists a long felt need for retaining the arms of the frame in a "closed" position, which makes storing or securing the sunglasses much easier and reduces the incidence of loss or damage. This is conventionally accomplished by providing some amount of friction to the hinge elements of the glasses, which is usually enough to retain the arms in a closed position, allowing them to be suspended from articles such as a person's shirt or automobile sun visor. However, often this friction is overcome by rigorous or sudden movements, or routine wear, causing the glasses to fall and possibly become damaged or lost.

Magnets have been used in the art to secure the arms of sunglasses frames, for example U.S. Pat. No. 5,682,222 discloses magnetic elements for such purpose. However, these designs are undesirable in that they position the magnets in close proximity to a wearer's body, often resulting in negative health effects, such as "blood stacking" or magnetic poisoning. For these reasons, many medical practitioners will not prescribe or recommend eyeglasses with magnetic elements.

There is a continued need in the art for glasses configured for magnetic closure while minimizing potential for adverse health effects.

SUMMARY OF THE INVENTION

The disclosure concerns eyeglasses with an integrated magnetic clip for removably attaching the eyeglasses to a wearer's clothing, a vehicular sun visor, or other object. The eyeglasses may embody any wearable optics device, such as, prescription glasses, reading glasses, sunglasses, and the like.

In one embodiment, eyeglasses are disclosed, the eyeglasses comprising: a frame system, the frame system including: a frame front, a first arm, and a second arm, the first arm attached to a first side of the frame front at a first hinge disposed therebetween, the second arm attached to a second side of the frame front at a second hinge disposed therebetween, the second side being opposite the first side; and at least one lens contained within the frame front. The eyeglasses are further characterized in that: the first arm of the frame system comprises a magnetic element coupled therewith, the magnetic element being disposed at a proximal end of the first arm adjacent to the first hinge, and the second arm comprises a strike-plate disposed at a distal end thereof; wherein the magnetic element and the strike-plate are configured to collectively form a magnetic clip.

In some embodiments, the magnetic element comprises a neodymium magnet.

In some embodiments, the magnetic element defines a first magnetic element coupled to the first arm, and the eyeglasses further comprising a second magnetic element coupled to a proximal end of the second arm; and the strike-plate defines a first strike-plate, and the eyeglasses further comprising a second strike-plate coupled to a distal end of the first arm.

In some embodiments, the strike-plate comprises a ferromagnetic material.

In some embodiments, the first arm comprises a recessed cavity extending from an external surface of the first arm into a volume thereof, and the magnetic element is contained within the recessed cavity.

In some embodiments, the eyeglasses further comprise a shield element. The shield element is generally selected to be one that dampens a magnetic field at one side of the magnetic element. For example, the shield element can comprise a ferromagnetic material. The shield element is generally disposed between the magnetic element and a wearer of the eyeglasses.

One or both arms may comprise a cover adapted to attach to the first arm at the recessed cavity for covering the shield element and magnetic element contained therein.

In alternative embodiments, eyeglasses are disclosed, the eyeglasses comprising: a frame system, the frame system including: a frame front, a first arm, and a second arm, the first arm attached to a first side of the frame front at a first hinge disposed therebetween, the second arm attached to a second side of the frame front at a second hinge disposed therebetween, the second side being opposite the first side; and at least one lens contained within the frame front. The eyeglasses are further characterized in that: the first arm of the frame system comprises: a first magnetic element coupled therewith, the first magnetic element being disposed at a proximal end of the first arm adjacent to the first hinge, and a first strike-plate disposed at a distal end thereof; and the second arm of the frame system comprises: a second magnetic element coupled therewith, the second magnetic element being disposed at a proximal end of the second arm adjacent to the second hinge, and a second strike-plate disposed at a distal end thereof; wherein: the first magnetic element and the second strike-plate are configured to form a first magnetic clip, and the second magnetic element and the first strike-plate are configured to form a second magnetic clip.

In some embodiments, the eyeglasses further comprise: a first shield element for dampening a first magnetic field between the first magnetic element and a wearer of the eyeglasses; and a second shield element for dampening a second magnetic field between the second magnetic element and the wearer.

In some embodiments, each of the first and second shield elements comprises a ferromagnetic material.

In some embodiments, each of the first and second magnetic elements comprises a neodymium magnet.

In some embodiments, each of the first and second strike-plates comprises a ferromagnetic material.

Other features and advantages will be appreciated by one with skill in the art upon a thorough review of the instant disclosure and the appended drawings.

BRIEF DESCRIPTION OF THE DRAWINGS

FIG. 9 shows a right-side of the eyeglasses in accordance with the second illustrated example.

FIG. 10 shows a left-side of the eyeglasses in accordance with the second illustrated example.

DETAILED DESCRIPTION OF THE PREFERRED EMBODIMENTS

For purposes of explanation and not limitation, details and descriptions of certain preferred embodiments are hereinafter provided such that one having ordinary skill in the art may be enabled to make and use the invention. These details and descriptions are representative only of certain illustrated embodiments. However, a myriad of other embodiments which will not be expressly described herein would be readily understood by one having skill in the art upon a thorough review hereof. Accordingly, any reviewer of the instant disclosure should interpret the scope of the invention by the claims, and such scope shall not be limited by the embodiments described and illustrated herein.

Eyeglasses generally comprise: a frame front, a first arm and a second arm. The first arm is coupled to the frame front at a first hinge, and the second arm coupled to the frame front at a second hinge distinct (and opposite) from the first hinge; with the frame front configured to receive at least one lens therein. Each of the first arm and the second arm comprises a corresponding external surface and internal surface. The internal surface is the surface facing a head of a user (or "wearer") when wearing the sunglasses, and wherein the external surface is the surface opposite the internal surface. The eyeglasses may embody any wearable optics device, such as, prescription glasses, reading glasses, sunglasses, and the like.

For purposes herein, we prefer to use the term "arm" when describing the component known as a "temple", since, the word "temple" is also used to describe the point on a person's head between a respective eye and ear. The terms "arm" and "temple" as they relate to eyeglasses shall be interchangeable with respect to the instant disclosure.

In one aspect, the eyeglasses comprise a magnetic clip integrated with arms of the eyeglasses.

In some embodiments, the eyeglasses may comprise two magnetic clips; one magnetic clip formed between a magnetic element of a first arm and a strike-plate of a second arm; and another magnetic clip formed between a magnetic element of the second arm and a strike-plate of the first arm.

Additionally, the eyeglasses may comprise a magnetic shield element or other features for magnetic field dampening. The shield element provides magnetic-field shielding and helps shield the wearer's body, specifically blood cells, from the magnetic field associated with the magnetic element(s), to prevent "blood stacking," or magnetic poisoning. This is accomplished two ways: (i) by positioning the magnetic element(s) at a proximal end of the arm where a significant air volume is formed between the sunglasses and a user's skin; and/or (ii) by providing a shield element between the magnetic element(s) and the user, where the magnetic field at the wearer's body will be reduced.

Example 1

Figure 1:
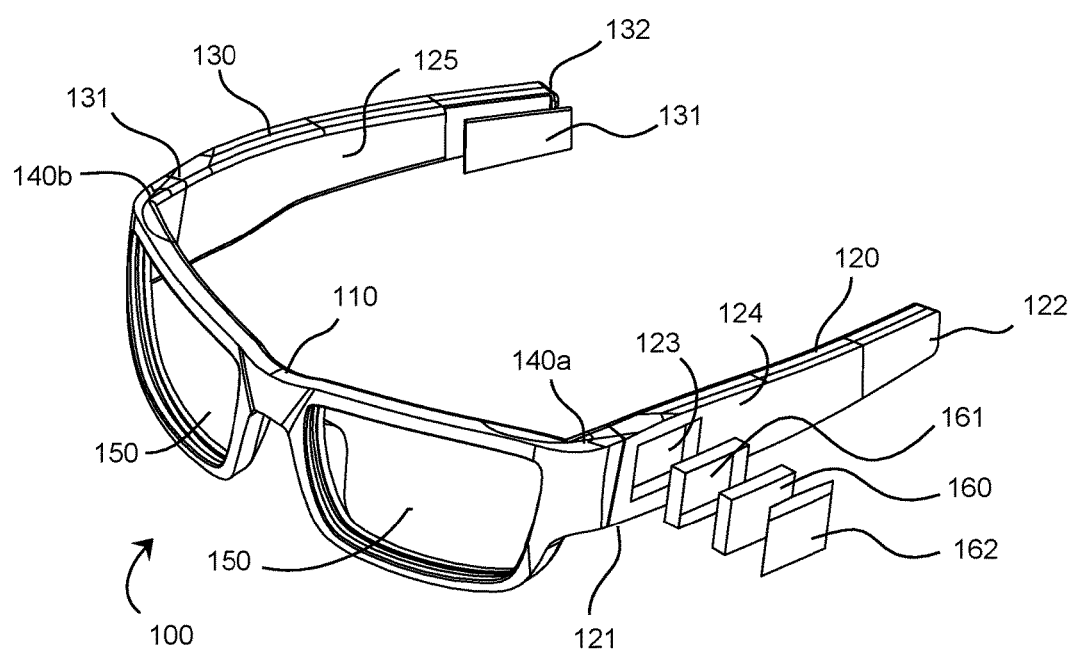
FIG. 1 shows a perspective view of eyeglasses in accordance with a first illustrated example, the eyeglasses being configured in an open configuration with arms extending perpendicular from the frame front, and further showing an exploded view of the contents of a recessed cavity, including: a shield element, a magnetic element, and a cover.
Figure 2:
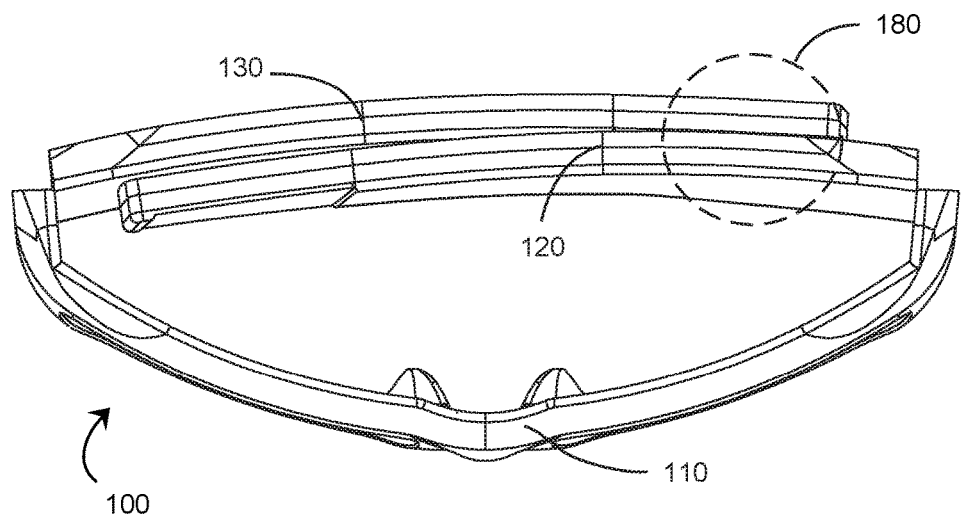
FIG. 2 shows a top view of the eyeglasses of the first illustrated example, the eyeglasses shown as-configured in a closed configuration.
Figure 3:
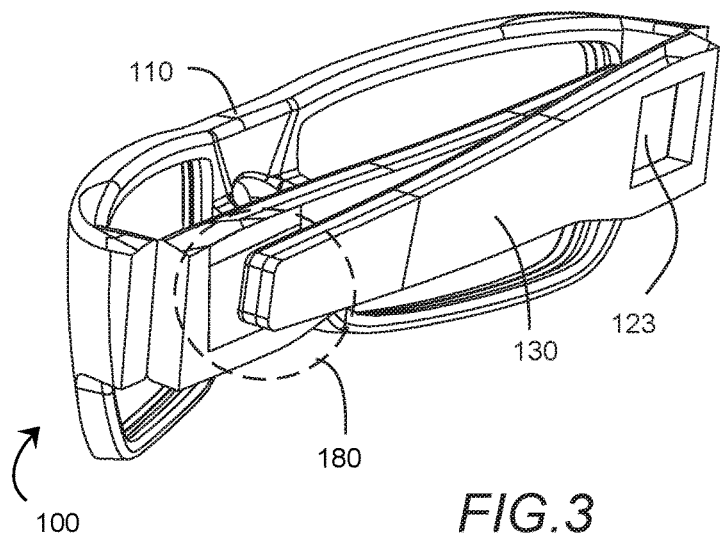
FIG. 3 shows the eyeglasses of FIG. 2 from an alternative view.

Now, in a first illustrated example as depicted in FIGS. 1-3, eyeglasses are shown and described.

FIG. 1 shows a perspective view of an eyeglasses product 100, configured in an "open configuration" where the arms 120; 130 of the frame system (110; 120; 130, collectively) are extended perpendicular with respect to the frame front 110.

The first arm 120 is attached to the frame front 110 at a first hinge 125, and the second arm 130 is attached to the frame front at a second hinge 135; with the frame front 110 configured to receive a pair of lenses 150 therein.

Although two lenses are shown in the illustrated embodiments, eyeglasses which embody only a single lens, or which embody three or more lenses, may be similarly practiced without departing from the spirit and scope of the invention.

While note shown, it should be understood that the hinge is generally formed by a mating of a tongue and groove of an arm and the frame front, respectively. A bolt, pin, or other fixation means is generally deployed to effectuate the hinge(s), though a bump and notch between hinge elements may be similarly employed, or any hinge mechanism that would be appreciated by one having skill in the art.

In the first illustrated example, the first arm 120 comprises a recessed cavity 123 configured to receive (shown in an exploded view) each of: a shield element 161, a magnetic element 160, and an optional cover 162. The recessed cavity 123 is shown disposed at a proximal end 121 of the first arm 120 adjacent to the first hinge 125, wherein the recessed cavity 123 extends from the external surface 124 of the first arm into a volume thereof.

The second arm 130 comprises a strike-plate 131 positioned on the interior surface 125 of the second arm at the distal end 132 thereof.

FIG. 2 shows a top view of the eyeglasses product 100, comprising: a frame front 110, a first arm 120 and a second arm 130 magnetically retained in a closed configuration. The magnetic element of the first arm and the strike-plate of the second arm are positioned in proximity to one another, when the eyeglasses are configured in the closed configuration as shown, forming a magnetic clip. The magnetic clip provides a function of clipping the eyeglasses to a wearer's clothing, such as a shirt, or alternatively to another object, such as a vehicular sun-visor.

FIG. 3 shows a rear view of the eyeglasses of FIG. 2, which are configured in a closed configuration such that the arms are aligned substantially parallel with respect to one another and the frame front. Upon configuring the first and second arms in the closed configuration, the magnetic element 160 of the first arm (see FIG. 1) is positioned to magnetically engage the strike-plate 170 of the second arm thereby forming a magnetic engagement for magnetically closing and retaining the two arms of the sunglasses frame, otherwise herein termed a "magnetic clip 180".

Additionally, FIG. 3 shows an empty recessed cavity 123 positioned on the second arm 130. This is intended to illustrate that each arm can comprise a distinct magnetic element disposed on its proximal end, and a strike-plate disposed on its distal end. In the embodiments shown in FIGS. 1-3, the eyeglasses comprise a single magnetic clip. For example, the second arm can comprise a cover above the recessed cavity thereof without a magnetic element, and the first arm may be produced without a strike plate thereon, such that only one magnetic clip is implemented in the eyeglasses. However, a dual magnetic clip arrangement may also be provided, which allows the user to freely open and close the arms of the sunglasses frame wherein an identical magnetic retention function is provided regardless of the order of arms as-folded, or whether the first arm is configured on top, or on bottom, relative to the second arm. Furthermore, a second recessed cavity may be omitted. As such, the eyeglasses may be provided with one or two magnetic clips in any configuration as-described.

The magnetic clip can be used to maintain the eyeglasses in closed configuration. The magnetic clip allows the user to not only keep the eyeglasses in a closed configuration, but it also allows the user to clip the glasses to a shirt, automobile sun visor, or suspend them around any fabric, or magnetically combine upon any metallic surface, or other object.

The frame system can be made out of plastic, wood or metal, with less conductive materials preferred for minimizing magnetization of the frame itself. An embodiment with a plastic frame can be made by common plastic forming techniques such as but not limited to: injection molding or compression molding, among others known to one with skill in the art.

The magnetic element can comprise, inter alia: any conventional magnet, preferably small enough to embed in the recessed cavity of the arm volume. The magnetic element may comprise a neodymium magnet or other rare earth magnet.

The shield element can comprise, inter alia: a metal plate, also preferably small enough to embed in the recessed cavity of the arm volume. This metal plate would help reduce the magnetic field at the user's skin. The thicker the shield element, the more it negates the magnetic field of the magnetic element. Also, the area of the shield element should preferably eclipse an area of the magnetic element for maximum dampening of the magnetic field of the magnetic element. The shield element may comprise any ferromagnetic material, preferably a steel plate.

The shield element, and specific positioning of the magnetic element, helps shield the user's blood from the magnetic field associated with the magnetic element, and can help prevent "blood stacking," or magnetic poisoning. This is accomplished two ways: (i) by positioning the magnets at the proximal end of the arms, as far forward as possible, wherein a significant air volume is formed between the sunglasses and a user's skin; and (ii) by providing a shield element between the magnetic element and the user, the magnetic field at the user will be reduced or eliminated. In the first illustrated example, the cavity and magnetic element(s) are positioned at the proximal end of the respective arm(s), near the hinge(s), and yields spacing from the magnet to the user's skin of one-half inch or more.

The cover 162 can comprise a thin piece of plastic or metal to secure the contents of the recessed cavity and sit flush with the external surface of the arm.

The strike-plate can be made of any ferromagnetic material. The strike-plate would preferably be sized to fit flush with the design of the arm and may be suspended thereon as shown.

Example 2

In another illustrated example, as depicted in FIGS. 4-18, eyeglasses with an integrated magnetic clip are shown and described.

Figure 4:
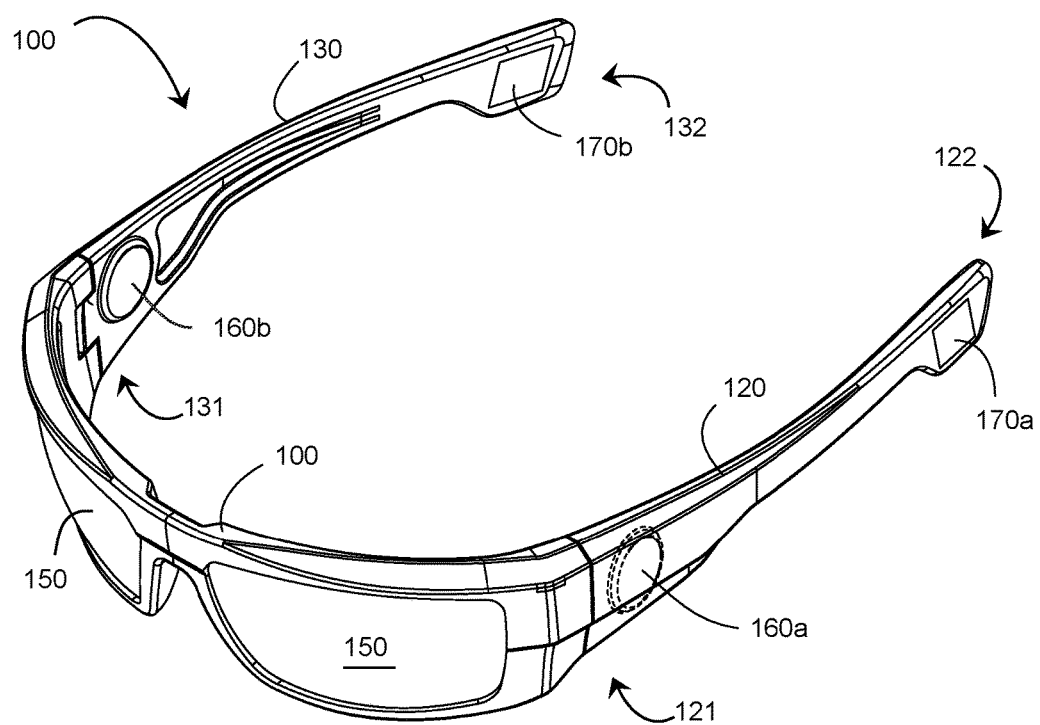
FIG. 4 shows a perspective view of eyeglasses in accordance with a second illustrated example.

FIG. 4 shows a perspective view of eyeglasses in accordance with a second illustrated example. In this example, the eyeglasses comprise: a frame system including: a frame front (110), a first arm (120), and a second arm (130). The first arm is attached to a first side (111) of the frame front at a first hinge (140a) disposed therebetween. The second arm attached to a second side (112) of the frame front at a second hinge (140b) disposed therebetween, the second side being opposite the first side. At least one lens (150) is contained within the frame front, the instant embodiment shows two lenses.

The eyeglasses are further characterized in that:

the first arm of the frame system comprises: a first magnetic element (160a) coupled therewith, the first magnetic element being disposed at a proximal end (121) of the first arm adjacent to the first hinge, and a first strike-plate (170a) disposed at a distal end (122) thereof; and the second arm of the frame system comprises: a second magnetic element (160b) coupled therewith, the second magnetic element being disposed at a proximal end (131) of the second arm adjacent to the second hinge, and a second strike-plate (170b) disposed at a distal end (132) thereof; wherein: the first magnetic element and the second strike-plate are configured to form a first magnetic clip (180a), and the second magnetic element and the first strike-plate are configured to form a second magnetic clip (180b).

Each of the magnetic elements and strike-plates may be individually implemented as an attached feature, or as an embedded feature. These features may be embedded by over-molding or other techniques known to one having skill in the art.

Figure 5:
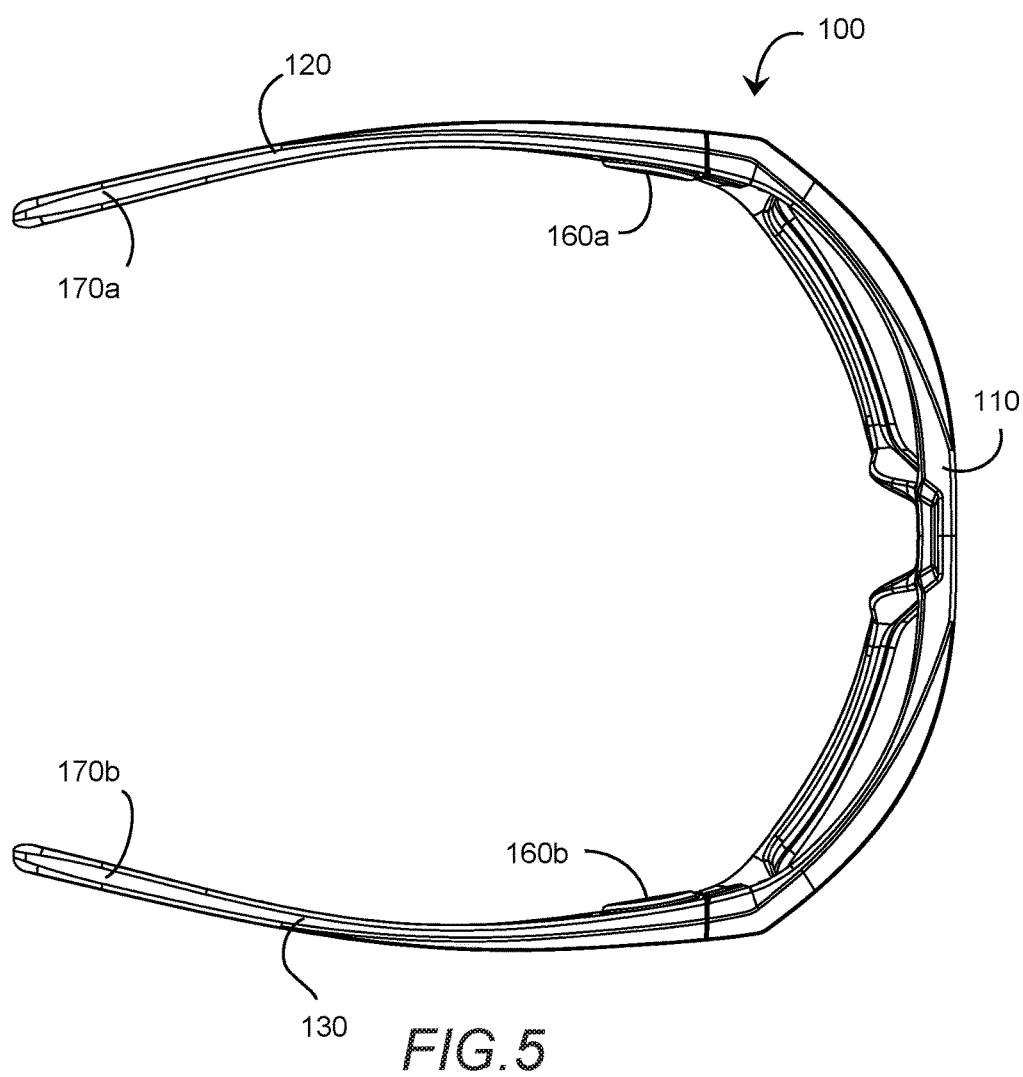
FIG. 5 shows a top view of the eyeglasses in accordance with the second illustrated example, the eyeglasses being configured in an open configuration with arms extending perpendicular from the frame front.

FIG. 5 shows a top view of the eyeglasses 100 in accordance with the second illustrated example, the eyeglasses being configured in an open configuration with arms 120; 130 extending perpendicular with respect to the frame front 110. First magnetic element 160a and first strike-plate 170a are shown as being embedded in the first arm 120. Likewise, second magnetic element 160b and second strike-plate 170b are shown as being embedded in the first arm 130.

Figure 6:
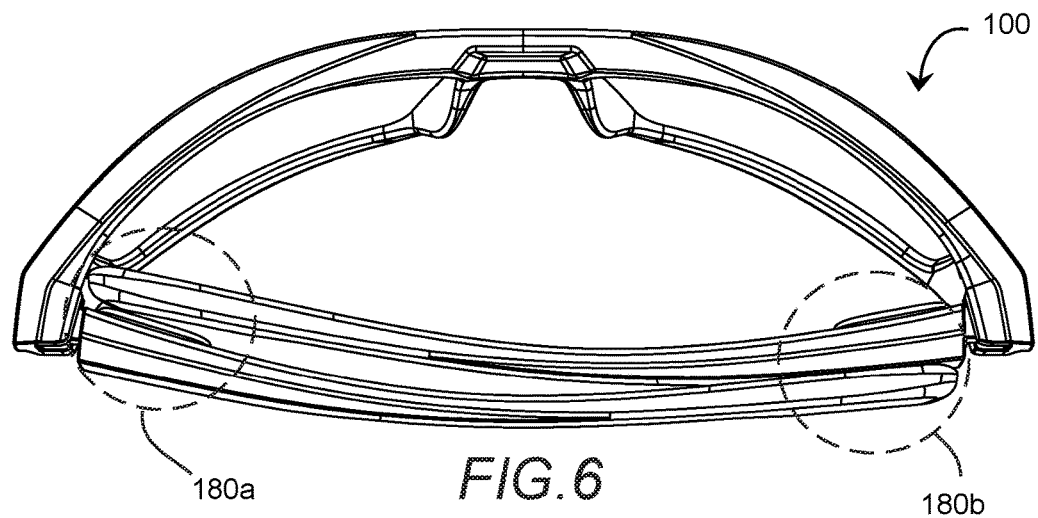
FIG. 6 shows a top view of the eyeglasses in accordance with the second illustrated example, the eyeglasses being configured in a closed configuration with arms extending parallel the frame front.

FIG. 6 shows a top view of the eyeglasses 100 in accordance with the second illustrated example, the eyeglasses being configured in a closed configuration with arms 120; 130 extending parallel with respect to the frame front 110. First magnetic clip 180a is formed by first magnetic element 160a and second strike-plate 170b. Additionally, second magnetic clip 180b is formed by second magnetic element 160b and first strike-plate 170a.

Figure 7:
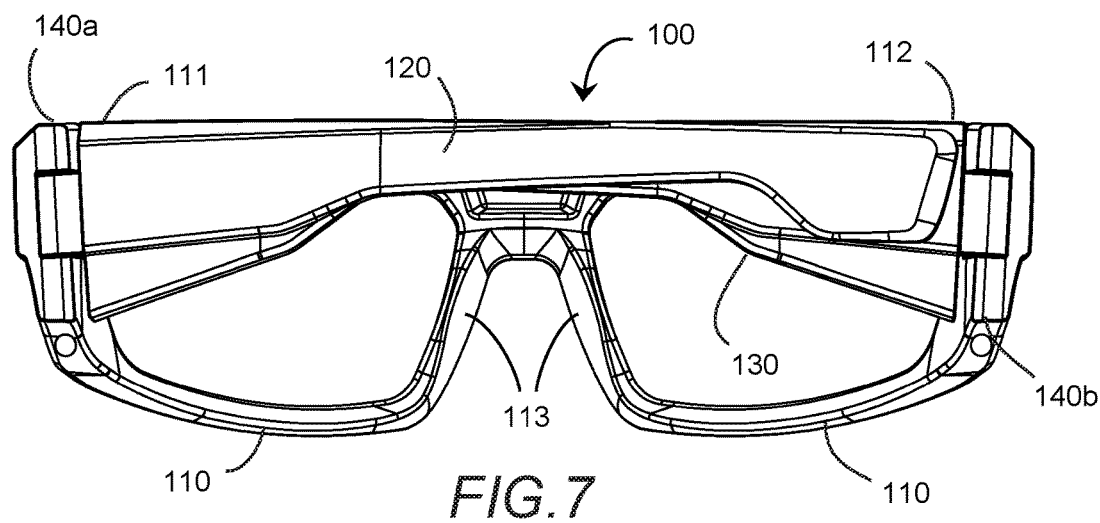
FIG. 7 shows a rear view of the eyeglasses in accordance with the second illustrated example.

FIG. 7 shows a rear view of the eyeglasses 100 in accordance with the second illustrated example. First hinge 140a is disposed between first arm 120 and first side 111 of frame front 110. Second hinge 104b is disposed between second arm 130 and second side 112 of frame front 110. Also shown are nose pads 113 positioned at the bridge between lenses of the front frame.

Figure 8:
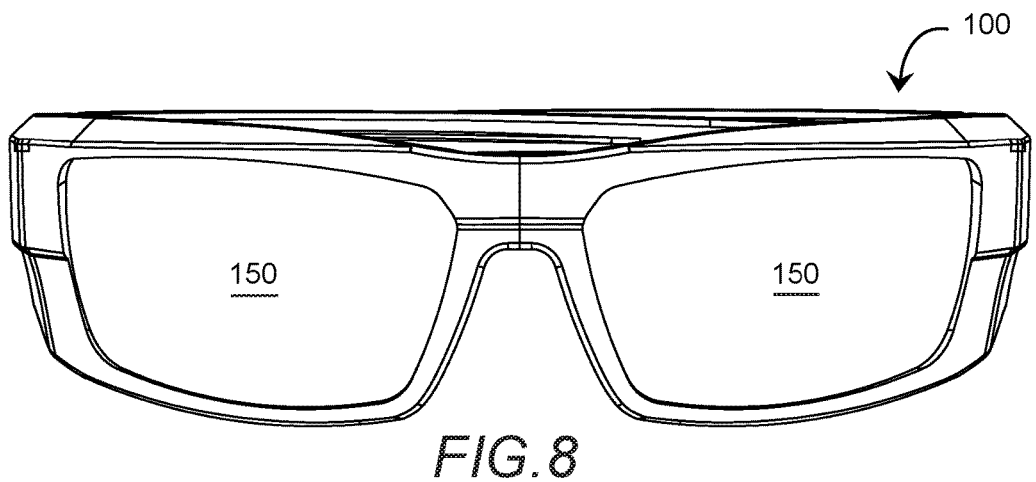
FIG. 8 shows a front view of the eyeglasses in accordance with the second illustrated example.

FIG. 8 shows a front view of the eyeglasses 100 in accordance with the second illustrated example. Two lenses 150 are each disposed in corresponding apertures of the front frame 110.

FIG. 9 shows a right-side of the eyeglasses 100 in accordance with the second illustrated example.

FIG. 10 shows a left-side of the eyeglasses 100 in accordance with the second illustrated example.

Figure 11:
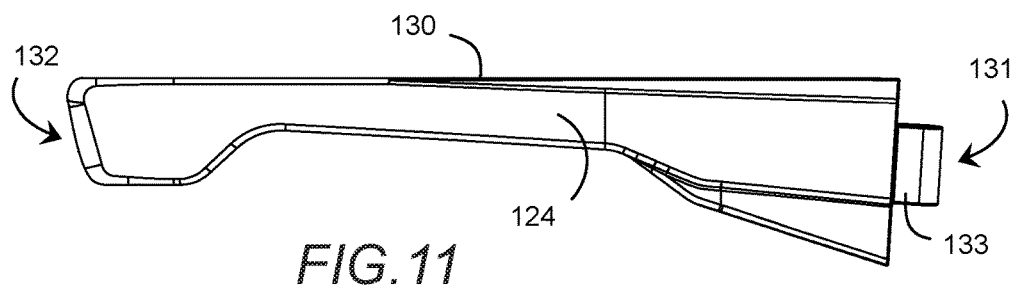
FIG. 11 shows an external surface of right arm of the eyeglasses in accordance with the second illustrated example.

FIG. 11 shows an external surface 124 of right arm (aka "second arm 130") of the eyeglasses 100 in accordance with the second illustrated example. Further illustrated is tongue 133 extending from the arm at the proximal end 131. The tongue is adapted to fit tightly within a corresponding groove of the front frame in accordance with known techniques. Opposite of the proximal end is distal end 132. Note that the left arm is a mirror opposite of second arm 130.

Figure 12:
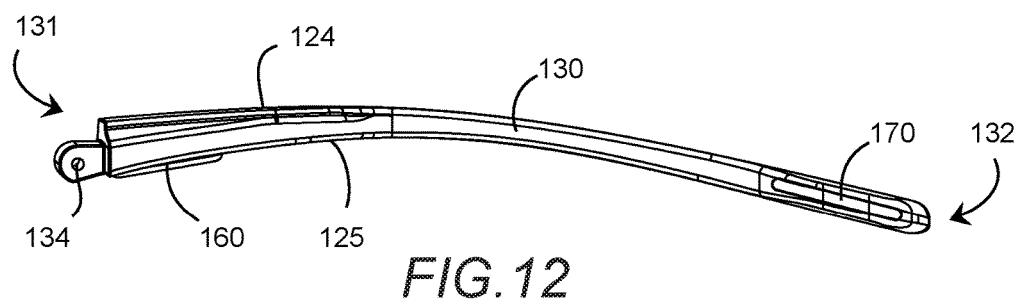
FIG. 12 shows a top view of the right arm of the eyeglasses in accordance with the second illustrated example.

FIG. 12 shows a top view of the second arm 130 of the eyeglasses 100 in accordance with the second illustrated example. From this view, both the external surface 124 and internal surface 125 are viewable. Also shown is magnetic element 160 disposed at proximal end 131 of arm 130. Strike-plate 170 is shown disposed at distal end 132 of arm 130. Further illustrated is pin channel 134 of the hinge, which is generally configured to receive a bolt or pin therein for securing the hinge components. Note that the first arm is a mirror opposite of this figure.

Optionally, a shield element (not shown) can be positioned at the magnetic element, adapted to remain between the magnetic element and the body of a wearer, the purpose of which is to shield a magnetic field of magnetic element 160. The shield element can be attached to, or embedded in the respective arm, and generally comprises a ferromagnetic material.

Figure 13:
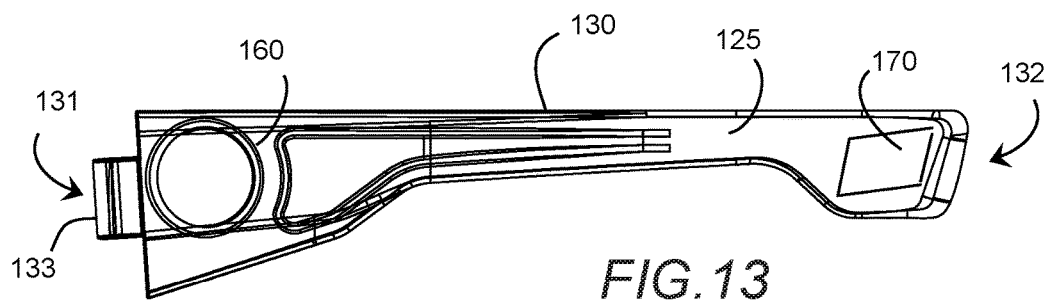
FIG. 13 shows an interior surface of right arm of the eyeglasses in accordance with the second illustrated example.

FIG. 13 shows an interior surface of the second arm 130 of the eyeglasses 100 in accordance with the second illustrated example. Internal surface 125 is shown along with magnetic element 160 at proximal end 131 and strike plate 170 disposed at distal end 132. Note that the first arm is a mirror opposite of this figure.

Figure 14:
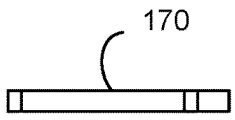
FIG. 14 shows a top view of a strike-plate in accordance with various embodiments.

FIG. 14 shows a top view of a strike-plate 170 in accordance with various embodiments. The strike plate may be formed into any shape that is consistent with the eyeglasses design at the distal end of a respective arm. Shown is a parallelogram shape strike-plate, though any shape will perform similarly.

Figure 15:
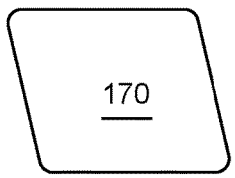
FIG. 15 shows a front view of a strike-plate in accordance with various embodiments.

FIG. 15 shows a front view of a strike-plate 170 in accordance with various embodiments.

Figure 16:
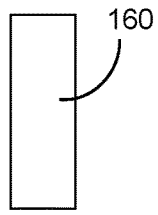
FIG. 16 shows a top view of a magnetic element in accordance with various embodiments.

FIG. 16 shows a top view of a magnetic element 160 in accordance with various embodiments. The magnetic element may be formed into any shape that is consistent with the eyeglasses design at the proximal end of a respective arm. Shown is a circular shape magnetic element, though any shape will perform similarly.

Figure 17:
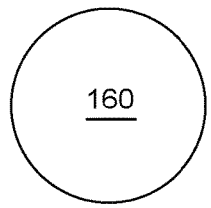
FIG. 17 shows a front view of a magnetic element in accordance with various embodiments.

FIG. 17 shows a front view of a magnetic element 160 in accordance with various embodiments.

Figure 18:
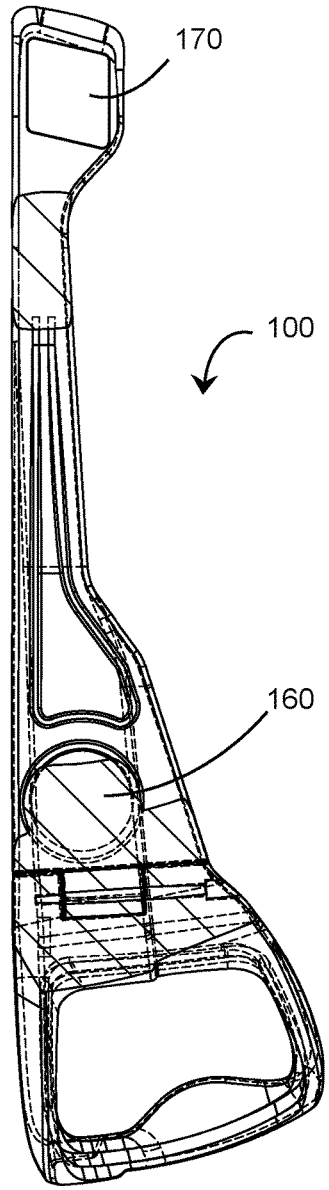
FIG. 18 shows a transparent side-view of the eyeglasses in accordance with the second illustrated example for revealing various components embedded within the frame system of the eyeglasses.

FIG. 18 shows a transparent side-view of the eyeglasses 100 in accordance with the second illustrated example for revealing various components embedded within the frame system of the eyeglasses. Of particular importance are magnetic element 160 and strike-plate 170, and their respective positions about the arm as-shown.

FEATURE LIST eyeglasses (100)
frame system (110; 120; 130)
frame front (110)
first side (111)
second side (112)
nose pads (113)
first arm (120)
proximal end of first arm (121)
distal end of first arm (122)
recessed cavity (123)
external surface (124)
internal surface (125)
second arm (130)
proximal end of second arm (131)
distal end of second arm (132)
tongue (133)
pin channel (134)
first hinge (140a)
second hinge (140b)
lens (150)
magnetic element (160)
first magnetic element (160a)
second magnetic element (160b)
shield element (161)
a first shield element (161a)
a second shield element (161b)
cover (162)
magnetic field (165)
strike-plate (170)
first strike-plate (170a)
second strike-plate (170b)
magnetic clip (180)
first magnetic clip (180a)
second magnetic clip (180b)

What is claimed is:

1. Eyeglasses (100), comprising:
a frame system including: a frame front (110), a first arm (120), and a second arm (130),
the first arm attached to a first side (111) of the frame front at a first hinge (140a) disposed therebetween,
the second arm attached to a second side (112) of the frame front at a second hinge (140b) disposed therebetween, the second side being opposite the first side; and
at least one lens (150) contained within the frame front; further characterized in that:
the first arm of the frame system comprises:
a recessed cavity (123) extending into a volume of the first arm,
a magnetic element (160) positioned within the recessed cavity, and
a shield element (161), the shield element selected to be one that dampens a magnetic field at one side of the magnetic element, and the shield element being contained within the recessed cavity,
the magnetic element being disposed at a proximal end (121) of the first arm adjacent to the first hinge, and
the second arm including a strike-plate (170) disposed at a distal end (132) thereof;
wherein:
the magnetic element and the strike-plate are configured to collectively form a magnetic clip (180).

2. The eyeglasses of claim 1, wherein the magnetic element comprises a neodymium magnet.

3. The eyeglasses of claim 1, the magnetic element defining a first magnetic element (160a) coupled to the first arm, and the eyeglasses further comprising a second magnetic element (160b) coupled to a proximal end (131) of the second arm.

4. The eyeglasses of claim 3, the strike-plate defining a first strike-plate (170a), and the eyeglasses further comprising a second strike-plate (170b) coupled to a distal end (122) of the first arm.

5. The eyeglasses of claim 1, wherein said strike-plate comprises a ferromagnetic material.

6. The eyeglasses of claim 1, wherein the recessed cavity is configured to extend from an external surface (124) of the first arm into a volume thereof.

7. The eyeglasses of claim 1, wherein the shield element is configured to be disposed between the magnetic element and a wearer of the eyeglasses.

8. The eyeglasses of claim 1, wherein the shield element comprises a ferromagnetic material.

9. The eyeglasses of claim 1, further comprising a cover (162) adapted to attach to the first arm at the recessed cavity for covering the shield element and magnetic element contained therein.

10. Eyeglasses (100), comprising:
a frame system including: a frame front (110), a first arm (120), and a second arm (130),
the first arm attached to a first side (111) of the frame front at a first hinge (140a) disposed therebetween,
the second arm attached to a second side (112) of the frame front at a second hinge (140b) disposed therebetween, the second side being opposite the first side; and
at least one lens (150) contained within the frame front; further characterized in that:
the first arm of the frame system comprises:
a first magnetic element (160a) coupled therewith, the first magnetic element being disposed at a proximal end (121) of the first arm adjacent to the first hinge,
a first shield element (161a) for dampening a first magnetic field between the first magnetic element and a wearer of the eyeglasses, and
a first strike-plate (170a) disposed at a distal end thereof; and
the second arm of the frame system comprises:
a second magnetic element (160b) coupled therewith, the second magnetic element being disposed at a proximal end (131) of the second arm adjacent to the second hinge,
a second shield element (161b) for dampening a second magnetic field between the second magnetic element and the wearer, and
a second strike-plate (170b) disposed at a distal end thereof;
wherein:
the first magnetic element and the second strike-plate are configured to form a first magnetic clip (180a), and
the second magnetic element and the first strike-plate are configured to form a second magnetic clip (180b).

11. The eyeglasses of claim 10, wherein each of the first and second shield elements comprises a ferromagnetic material.

12. The eyeglasses of claim 10, wherein each of the first and second magnetic elements comprises a neodymium magnet.

13. The eyeglasses of claim 10, wherein each of the first and second strike-plates comprises a ferromagnetic material.

14. Eyeglasses, comprising:
a frame system including: a frame front (110), a first arm (120), and a second arm (130),
the first arm attached to the frame front at a first hinge (140a),
the second arm attached to the frame front at a second hinge (140b); and
at least one lens (150) contained within the frame front; the eyeglasses further comprising:
a magnetic element (160) coupled to one of the first and second arms,
a strike plate (131) coupled to the other of the first and second arms, and
a shield element (161) positioned adjacent to the magnetic element;
wherein the magnetic element and the strike plate combine to form a magnetic clip; and
wherein the shield element is configured to dampen a magnetic field between the magnetic element and a wearer of the eyeglasses.

15. The eyeglasses of claim 14, wherein each of the magnetic element and the shield element are configured to be disposed within a recessed cavity, the recessed cavity extending into a volume of said one of the first and second arms.

16. The eyeglasses of claim 14, wherein each of the magnetic element and the shield element are embedded in a volume of said one of the first and second arms.

* * * * *